United States Patent [19]

Kessler et al.

[11] Patent Number: 4,571,770
[45] Date of Patent: Feb. 25, 1986

[54] WINDSHIELD WIPER DEVICE FOR MOTOR VEHICLES

[75] Inventors: Peter Kessler, Sasbach; Jürgen Mayer, Gaggenau, both of Fed. Rep. of Germany

[73] Assignee: Robert Bosch GmbH, Stuttgart, Fed. Rep. of Germany

[21] Appl. No.: 658,615

[22] Filed: Oct. 9, 1984

[30] Foreign Application Priority Data

Nov. 9, 1983 [DE] Fed. Rep. of Germany ....... 3340404

[51] Int. Cl.$^4$ ............................. B60S 1/02; B60S 1/38
[52] U.S. Cl. ............................. 15/250.42; 15/250.36; 15/250.39
[58] Field of Search .......................... 15/250.32–250.42

[56] References Cited

U.S. PATENT DOCUMENTS 3,874,020 4/1975 Van Eckelen et al. .......... 15/250.36
4,442,566 4/1984 Sharp ............................. 15/250.42

FOREIGN PATENT DOCUMENTS 2499486 8/1982 France .................... 15/250.39

Primary Examiner—Timothy F. Simone
Attorney, Agent, or Firm—Michael J. Striker

[57] ABSTRACT

A wiper device for wiping windshield panes of motor vehicles includes an oscillating blade driven in the direction transverse to the direction of its elongation and having a support with at least two pairs of end claws and an elastic rail having a wiper lip facing the pane being cleaned and held on the support by the end claws. Two end holding members are provided on the elastic rail which form stops cooperating with respective stop shoulders formed by the end faces of the claws to limit a longitudinal displacement of the rail and the wiper lip relative to the support. To permit the use of the same wiper element with the supports, the stop shoulders of which are positioned closer to each other, spacers are installed between the stops of the holding members and the stop shoulders of the support.

7 Claims, 5 Drawing Figures

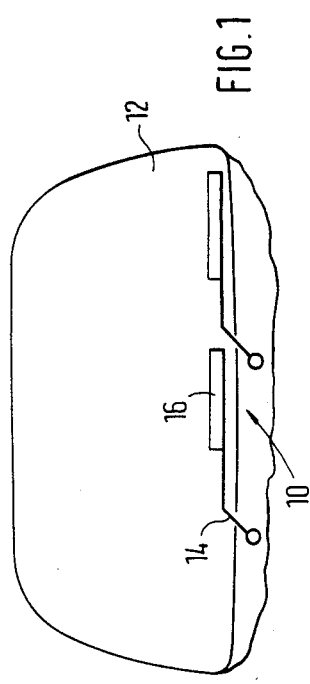
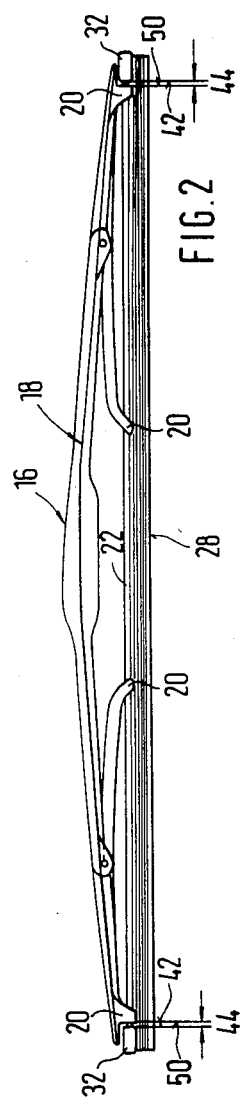
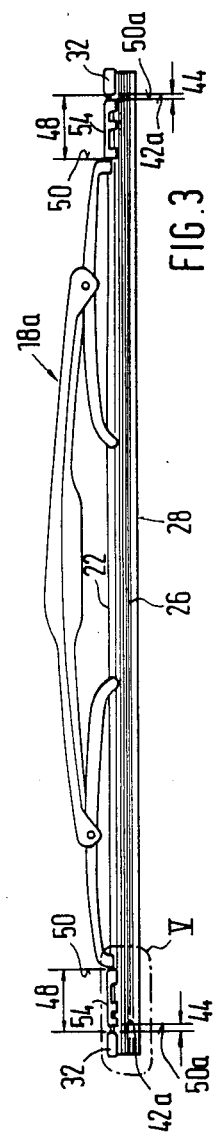

WINDSHIELD WIPER DEVICE FOR MOTOR VEHICLES

BACKGROUND OF THE INVENTION

The present invention relates to a windshield wiper device.

Windshield wiper devices, in which the elastic rail is connected immediately to a wiper arm of the device, are known in the art. The windshield wiper devices of the type under discussion include driven oscillating wiper arms and wiper blades connected to the respective wiper arms. Each wiper blade includes an elongated wiper element which has a wiper lip applied onto a windshield to be wiped off. The elongated elastic rail is made of elastic plastics. The wiper element is longitudinally displaceable relative to the wiper support a predetermined distance whereby the rail together with the elastic wiper lip can be adjusted to curvatures of the outer surface of the windshield pane being cleaned over the entire area of the windshield pane. However, when the movability of the wiper element relative to the rail exceeds a required value the wiper element travels in the direction of its elongation so that an undersired area of wiping occurs.

SUMMARY OF THE INVENTION

It is an object of the present invention to provide an improved wiper device for cleaning windshield panes of motor vehicles.

It is another object of this invention to provide a wiper element which can be selectively employed and combined with wiper supports of various lengths.

These and other objects of the invention are attained by a wiper device for windshields of motor vehicles, comprising an elongated wiper blade driven in a direction transverse to the direction of the elongation of the blade and including a blade-carrying support having at least two pairs of claws spaced from each other in said direction of elongation, an elongated wiper element including a rail receiving said claws and held thereby, and a wiper lip connected to said rail and adapted to lie against a surface of a windshield pane to be wiped off, said wiper element being displaceable relative to said support and having stops at two ends thereof, said claw pairs having stop shoulders cooperating with the stops of the wiper element to limit a displaceability of said wiper element relative to said support, and at least one spacer positioned between at least one stop and a respective stop shoulder to reduce the displaceability of said wiper element relative to said support.

The chief advantage of the present invention resides in that the same wiper element, composed of the elastic rail and the wiper strip or lip, can be combined with the wiper support of any desired length, also when the distances between the stop and counter stop surfaces vary because, due to the provision of the spacers, the amount of displacement of the wiper element relative to the support always remains limited.

The wiper element may be provided with opposite grooves extended in said direction of elongation, said claw pairs being engaged in said opposite grooves, said spacer having projections inserted in the grooves of the wiper element, said wiper element having a side facing toward said support, said spacer overlapping said wiper element at said side. The grooves may be formed at the longitudinal sides of the elastic rail.

The spacer may be formed with at least two pairs of said projections spaced from each other in the direction of elongation of the wiper element.

The spacer may have breaking point-means extended in the direction transversal to the direction of elongation of said wiper element.

The breaking point means may be positioned between two neighboring pairs of said projections.

The claw pairs may have edges facing away from each other, said edges forming said stop shoulders.

The wiper device may further include end holding members connected to said wiper element at the end thereof, said end holding members having end faces facing towards each other and forming said stops.

Each spacer has two opposite sides in the direction of elongation of said wiper element; said sides may form counter stops which respectively cooperate with a respective stop of the wiping element and a respective stop shoulder of said support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a schematic view of the wiper device applied to a windshield of a motor vehicle;

FIG. 2 is a side view of the wiper device of FIG. 1 according to the prior art;

FIG. 3 is a side view of the wiper device according to the invention;

DETAILED DESCRIPTION OF THE PREFERRED EMBODIMENTS

Figure 4:
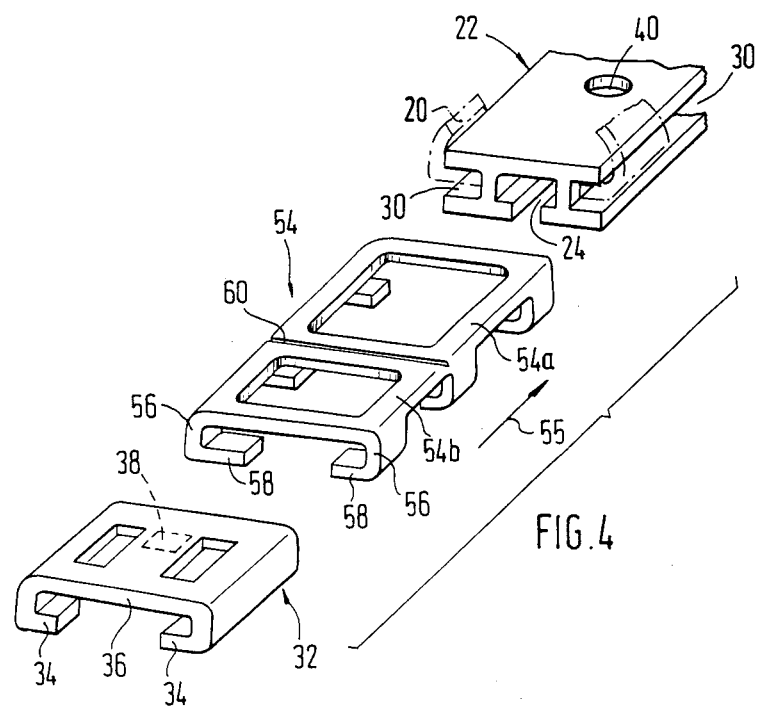
FIG. 4 is an exploded perspective view showing a rail, a spacer and a support for securing the supporting element on the wiper element.

Referring now to the drawings more specifically, a wiper device 10 for wiping-off a windshield pane 12 of a motor vehicle includes a wiper arm 14, driven to oscillate against the pane 12 by a non-illustrated conventional drive, and a wiper blade 16 held on the free end of the wiper arm 14. The latter is driven to oscillate so that in operation of the wiper device the wiper blade is moved transverse of its elongation over the pane 12 being cleaned.

The construction of the wiper blade 16 of the conventional design is illustrated in FIG. 2. The wiper blade 16 has a support 18 which has a plurality of claw pairs 20 which engage a supporting rail 22. The latter has an elongated receiving groove 24 shown specifically in FIG. 4. An elastic or flexible wiper lip or strip 26 is held in elongated groove 24. The wiper strip 26 has a wiping edge 28 which lies against windshield pane 12. Claws 20 of the support 18 are arranged in pairs and are engaged in oppositely positioned lateral grooves 30 formed in rail 22 as also seen in detail in FIG. 4. Rail 22 can execute a displacement relative to support 18 whereby claws 20 of support 18 will slide in grooves 30 of rail 22. In order to limit the movability of the wiper rail 22 in the direction of its elongation relative to support 18 end holding members 32 are provided, which are arranged at both ends of elastic rail 22, and each of which extends outwardly from the respective end pair of claws 20. The end holding members 32 have U-shaped cross-section as shown in detail in FIG. 4. Two opposite legs or projections 34 have U-shaped configuration. Legs 34 are guided in lateral grooves or recesses 30 of rail 22. Each end holding member 32 also has a base portion 36 on the inner wall of which an elastic pivotable arresting nose or projection 38 is formed, which, upon the displacement of the respective holding member 32 along rail 22, is clamped and locked in an assigned recess 40 formed in the rail 22. In this locked or arrested position, shown in FIG. 2, an unintentional release between support 18 and wiper element 22, 26 is prevented by end holding members 32. In this position the two opposite side surfaces 42 of holding members 32 form stops for wiper element 22, 26, which stops cooperate with stop shoulders of support 18. The stop shoulders of support 18 are formed by two edges 50 formed by two opposite end faces of the opposite end pairs of claws 20. The distance between the two side surfaces 42 of the holding members 32, facing away from each other, is so selected that it is greater than the distance between two opposite edges 50 of end pairs of claws 20 by the amount equal to the double distance 44. The wiper element formed of rail 22 and strip 26 can also be displaced relative to support 18 in the longitudinal direction a distance equal to the double distance 44. This is necessary to enable the wiper strip together with the elastic rail 22 to adapt to the buckling of the pane outer surface over the entire area of wiping during the cleaning operation.

Reference is now made to FIG. 3 which depicts the embodiment according to the present invention. The wiper device includes a support 18a, the overall length of which is smaller than that of support 18 of the conventional wiper device. In case the overall lengths of the whole wiper-devices of the embodiments of FIGS. 2 and 3 are the same the difference between the length of support 18 and that of support 18a is a double dimension 48. The wiper strip 26 in the embodiment of FIG. 3, e.g. according to the invention, can travel back and forth in the direction of its elongation a double distance 48 so that a considerable shifting of a wiping area on the pane 12 is obtained. Such a variation is not, however, allowed for legal reasons. To maintain the position of the wiping field within allowable tolerances a spacer or distance holder 54 is arranged at each end of the support 18a between the inner end face of the assigned holding member 32 and the outer end face of the respective end claw pair 20. The spacers 54 reduce the movability of wiper element 22, 26 relative to support 18a in the direction of its elongation by an allowable distance which is a double distance 44. Stops 42 of wiper element 22, 26 are in this case formed by end faces 42a of holding members 32, facing towards each other. These end faces 42a cooperate with respective end surfaces 50a of distance holders 54. Each distance holder or spacer 54 has a U-shaped cross-section similarly to that of each holding member 32 as shown in FIG. 4. Each spacer 54 has U-shaped legs 56, on the free ends of which opposite abutments or projections 58 are formed, which projections are eventually guided in respective grooves 30 of the rail 22. Each spacer therefore engages with its projections 58 the wiper element 22, 26 on the side thereof facing the support 18a. Each spacer has three pairs of claw-shaped legs 56, spaced from each other longitudinally of the spacer. Each spacer further includes a breaking point or safety limit 60 which is arranged transversely of the elongation of the wiper element. The breaking point 60 is positioned between two neighboring pairs of projections 58. The length of each spacer is so selected that the length of both of them is somewhat smaller than the double dimension or distance 48 as shown in FIG. 3. The remaining difference between the distances corresponds to the doubled distance 44 of FIG. 2 which is required to ensure the necessary adjustment of the wiper strip or lip to the curved outer surface of the pane being wiped off.

The end faces of the spacers 54, facing away from the wiper element 22, 26 in the direction of elongation of the wiper device also form counter stops or counter stop shoulders which cooperate with stops 42 of the wiper element 22, 26 or with stop shoulders 50 of support 18a.

The wiper device according to the present invention permit the utilization of similar wiper elements 22, 26 with the wiper supports of various lengths because, due to the provision of spacers 54, the excessive dimension 48 or difference in the lengths is reduced to a required length difference 44. The provision of the breaking point 60 considerably enlarges the range of the utilization of the present invention because it makes possible, by shortening the spacers, the use of supports 18a of various lengths with one individual type of wiper element 22, 26.

Figure 5:
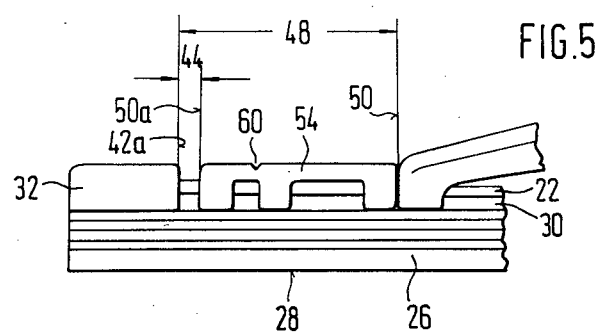
FIG. 5 is a unit indicated by V in FIG. 3.

As shown in FIGS. 4 and 5 each spacer 54 can be mounted in the device in a predetermined manner. When dimension 48 is smaller than the length of spacer 54 the latter is shorttened by breaking the spacer at the breaking point or line 60 and its portion 54a or 54b is used as a spacer depending on the requirement.

The assembly of wiper blade 16 is obvious from FIGS. 4 and 5. First, the end of rail 22 is connected to the holding member 32 and then the first spacer 54 is brought with its projections 58 into grooves 30 of the rail. Now the assembling of support 18a by the insertion of claws 20 into grooves 30 takes place. In the further assembling step the second spacer 54 is placed onto rail 32 by means of projections 58 inserted into grooves 30, and then the assembly is completed by mounting the second holding member 32 to the rail 22. After securing the first holding member 32 to rail 22 the further assembling is conducted in the direction of arrow 55 in FIG. 4.

It will be understood that each of the elements described above, or two or more together, may also find a useful application in other types of wiper devices for windshields of motor vehicles differing from the types described above.

While the invention has been illustrated and described as embodied in a wiper device for a windshield of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A wiper device for windshields of motor vehicles, comprising an elongated wiper blade driven in a direction transverse to the direction of the elongation of the blade and including a blade-carrying support having at least two pairs of claws spaced from each other in said direction of elongation, an elongated wiper element including a rail receiving said claws and held thereby, and a wiper lip connected to said rail and adapted to lie against a surface of a windshield pane to be wiped off, said wiper element being longitudinally diplaceable relative to said support and having stops at two ends thereof, said claw pairs having stop shoulders cooperating with the stops of the wiper element to limit a displaceability of said wiper element relative to said support, and at least one spacer positioned between at least one stop and a respective stop shoulder to reduce the displaceability of said wiper element relative to said support, said wiper element being provided with opposite grooves extended in said direction of elongation, said claw pairs being engaged in said opposite grooves, said spacer having projections insertable in the grooves of the wiper element, said wiper element having a side facing toward said support, said spacer overlapping said wiper element at said side, said spacer being formed with at least two pairs of said projections spaced from each other in the direction of elongation of said wiper element, said spacer having breaking point-means extended in the direction transversal to the direction of elongation of said wiper element, whereby said spacer can be broken and thereby adjusted to blade-carrying supports of various lengths.

2. The device as defined in claim 1, wherein said breaking point means is a means for reducing a cross-sectional area of said spacer.

3. The device as defined in claim 1, wherein said breaking point means is positioned between two neighboring pairs of said projections.

4. The device as defined in claim 1, wherein said claw pairs have edges facing away from each other, said edges forming said stop shoulders.

5. The device as defined in claim 4, further including end holding members connected to said wiper element at the end thereof, said end holding members having end faces facing towards each other and forming said stops.

6. The device as defined in claim 5, wherein the spacer is positioned between each holding member and the edge of the respective claw pair.

7. The device as defined in claim 6, wherein the spacer has two opposite sides in the direction of elongation of said wiper element, said sides forming counter stops which respectively cooperate with a respective stop of the wiping element and a respective stop shoulder of said support.

* * * * *